Figure 1:
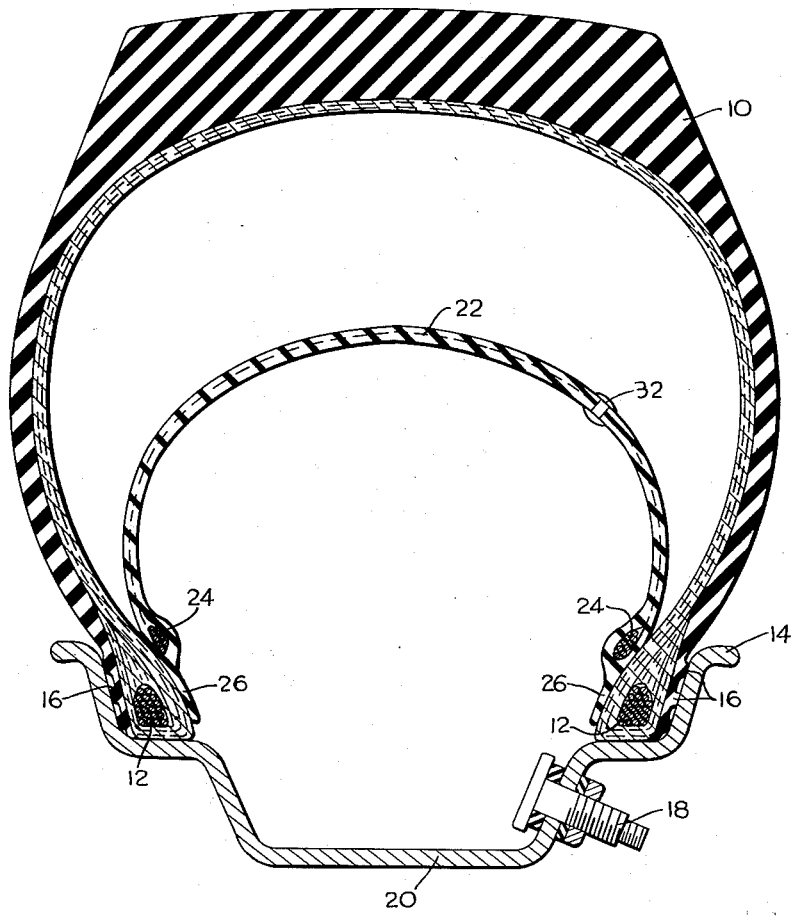

July 19, 1955   B. DARROW   2,713,372

TUBELESS TIRE AND SAFETY DIAPHRAGM COMBINATION

Filed April 20, 1950

INVENTOR.
Burgess Darrow
BY
*Oldham & Oldham*
ATTORNEYS

United States Patent Office 2,713,372
Patented July 19, 1955

2,713,372

TUBELESS TIRE AND SAFETY DIAPHRAGM COMBINATION

Burgess Darrow, Akron, Ohio, assignor to The Firestone Tire & Rubber Company, Akron, Ohio, a corporation of Ohio Application April 29, 1950, Serial No. 157,064

10 Claims. (Cl. 152—342)

This invention relates to tubeless tires and, more particularly, to the association of a safety diaphragm with the tire, the diaphragm functioning to prevent collapse of the tire in case of blowout.

Heretofore, it has been proposed to employ safety tubes with a conventional tube-receiving type of pneumatic tire, such safety tubes being, for example, illustrated and described in United States Patent No. 2,090,210, and acting to prevent the sudden loss of air pressure in the tire and the attendant collapse of the tire in case of blowout. In my previous patent, namely U. S. Patent No. 2,168,514, I have disclosed an improved type of safety tube adapted to be associated with a conventional pneumatic tire, and with my tube functioning to retain a considerable volume of air in a secondary or inside tube of fabric-reinforced rubber in case of a blowout in the tire to thereby permit control and stopping of the car.

In recent years, some efforts have been made to revise, bring up to date, and apply to present type tire and rim design the basically old tubeless tire idea, and these efforts have resulted in some success and encouragement. However, tubeless tires are naturally not adapted to be employed in conjunction with safety tubes of the types disclosed in the above-indicated patents, and, hence, tubeless tires today are not being safeguarded against accidents resulting from blowouts.

The application of the principles of the safety tube to a tubeless tire is not easy, and involves numerous complications. If the complete inside tube of fabric-reinforced fabric (of a conventional safety tube) is associated with the tubeless tire, a structure is provided which is inherently costly, inflation becomes a problem, and mounting and demounting the tubeless tire and the associated safety tube offer complications. Securing the safety tube or a diaphragm to the tubeless tire in permanent fashion would prevent the inner periphery of the tubeless tire from being examined and repaired in case of puncture of the tire, and yet if the tube or diaphragm is not so secured, the proper safety action may not be achieved, and misplacement may occur.

It is the general object of my invention to avoid and overcome the foregoing and other difficulties of and objections to tubeless pneumatic tires by the provision of a relatively inexpensive and yet durable, efficient and foolproof safety diaphragm in adhesively secured but removable association with the beads of a pneumatic tire whereby substantially all of the advantages of a safety tube are incorporated with the tubeless tire.

Another object of my invention is to provide the combination of a tubeless tire and a safety diaphragm in which the diaphragm is held in place by means of substantially inextensible beads adhesively but releasably secured to the inside of the beads of the tubeless tire.

Another object of my invention is the provision of an inexpensive but sturdy and long-lived construction for releasably securing the side edges of a tire-shaped safety diaphragm adjacent the bead portions of a tubeless tire.

Another object of my invention is to provide a tubeless tire with a safety diaphragm for preventing collapse of the tire upon blowout.

The foregoing objects of my invention, and other objects which will become apparent as the description proceeds, are achieved by the provision of a tubeless pneumatic tire including a flexible, fabric-reinforced diaphragm of tire-like shape but smaller than the inside of the tire and positioned inside the tire so that the diaphragm, except at its lateral edges, is spaced from the inside of the tire, substantially inextensible beads at the lateral edges of the diaphragm, and adhesive means fastening the bead portions of the diaphragm adjacent the inside of the beads of the tire, the diaphragm having a restricted passage therethrough. Usually associated with the bead portions of the diaphragm are flexible attaching strips of fabric-reinforced rubber which extend radially inwardly of the beads to form flexible lip portions which facilitate the releasable mounting of the bead portions of the diaphragm in association with the bead portions of the pneumatic tire. The diaphragm is preferably constructed of two plies of oppositely laid rubberized bias-cut cord fabric having the lateral edges of at least one ply turned around the beads, and the lateral edges of the other ply may be extended radially inwardly of the beads to form the flexible lip portions heretofore noted.

Figure 3:
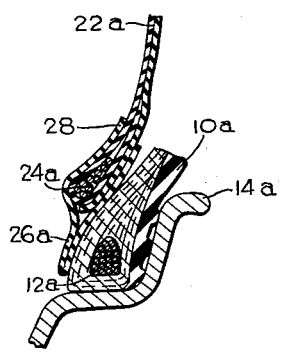
Figure 4:
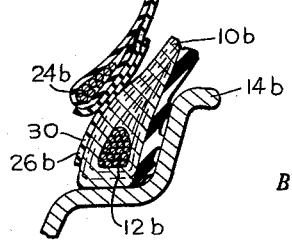
Figure 2:
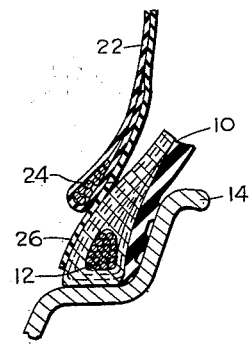

For a better understanding of my invention, reference should be had to the accompanying drawings, wherein Fig. 1 is a transverse cross-sectional view through a tubeless pneumatic tire and rim and having incorporated therewith a safety diaphragm incorporating the principles of my invention;

Fig. 2 is an enlarged fragmentary view of the bead portions of the tire and safety diaphragm illustrating one typical manner of construction; and Figures 3 and 4 are views similar to Fig. 2 but illustrating modifications of the structure of Fig. 2.

Having reference to the drawings, the numeral 10 indicates generally a tubeless pneumatic tire of the so-called straight, side-wall type and having substantially inextensible beads 12 of conventional type and adapted to be mounted upon an endless drop-center rim 14. Usually a tubeless tire of this type has a special sealing area, such as ribs 16, between the laterally outside portions of the beads and the side flanges of the rim 14. Also, in a tubeless tire construction, a valve stem 18 is ordinarily associated with the drop-center well 20 of the rim 14, the valve stem having an airtight relation with the rim.

Associated with the tubeless tire combination described is a flexible fabric-reinforced rubber diaphragm 22 of tire or toric shape which is positioned inside the tire 10 and being of smaller size and diameter than the inside of the tire so that the diaphragm is spaced from the inside periphery of the tire, substantially in the manner shown, except that the lateral edges of the diaphragm 22 are removably associated with the inside surfaces of the tire beads. This is achieved by providing substantially inextensible wire beads 24 at or adjacent the lateral edges of the diaphragm 22. Preferably the diaphragm 22 is made from two oppositely laid plies of bias-cut rubberized cord fabric, and as best seen in Fig. 2 of the drawings, at least one ply of the rubberized fabric has its lateral edges folded around the beads 24. The other ply of the rubberized fabric of the diaphragm 22 may be extended radially inwardly of the bead 24 to provide a fabric reinforced flexible rubber lip 26 which extends substantially to the toe of the bead 12 of the tire 10.

The inextensible wire beads 24 provide load-carrying members which give a strength and support to the diaphragm 22 that greatly enhances the operability of the safety diaphragm and serves to substantially prevent separation of the edges of the diaphragm from the inside of the beads of the tire in the normal use of the pneumatic tire or in the event of blowout of the tire.

The flexible lip portions 26 at the lateral edges of the diaphragm 22 and the sides of the bead portions of the diaphragm are adhesively but removably secured adjacent the inside of the beads of the tire 10, as by the provision of rubber or other cements. Because of the presence and function of the beads 24, the shearing stress on the rubber or other cements during the normal use of the tire or during the operation of the diaphragm in case the tire has blown out is greatly reduced, and separation of the edges of the diaphragm from the inside of the tire are substantially prevented.

On the other hand, in case the pneumatic tire 10 suffers a puncture and it becomes necessary to repair the tire, then it is a relatively simple matter to strip the lateral edge of the diaphragm, usually at one side only away from the associated pneumatic tire bead so as to permit access to the interior surface of the tire for purposes of repair. It will be understood that the tubeless pneumatic tire is ordinarily provided with an air-pervious lining, sometimes of non-vulcanizing soft and gummy rubber of the self-sealing type, and that in a puncture repair, this lining may have to be examined and repaired.

It is also to be noted that it is important to place and position the beads 24 of the diaphragm 22 at a radial distance from the rotary axis of the tire 10 about equal to the radial distance from the tire axis to the top edges of the tire-retaining flanges of the rim 14. This keeps the beads 24 and the diaphragm 22 out of the way when the tire is mounted and demounted on the rim 14, and also aligns the beads 24 and 12 for proper stress distribution.

Turning now to the embodiment of my invention illustrated in Fig. 3, like parts have been indicated by the same numerals, except the suffix "a" has been added. The diaphragm 22a is again formed of two oppositely-laid plies of bias-cut rubberized cord fabric, and one ply has its lateral edges folded around the bead 24a in the manner heretofore described. The other ply comes down and is pressed around the base of the bead in the manner illustrated. Then, in addition, a flexible strip of fabric-reinforced rubber 28 is folded around the bead portion of the diaphragm 22 and provides a flexible fabric-reinforced lip 26a which extends radially inwardly of the bead 24a and down substantially to the toe of the tire bead 12a.

In Fig. 4 is illustrated a modification in which like parts have been indicated by like numerals, except that the suffix "b" has been added. The diaphragm 22b is again formed of several plies of rubberized bias-cut cord fabric, one ply having its lateral edges turned around the bead 24b and folded back on itself, and a second ply having its edge tucked under and terminating at the base of the bead. A flexible strip of fabric-reinforced rubber 30 is secured to each edge of the diaphragm and provides a lip portion 26b which extends radially inwardly of the bead 24b and substantially to the toe of the tire bead 12b of the pneumatic tire 10b.

From the foregoing, it will be recognized that the various objects of my invention have been achieved by the provision of a relatively inexpensive and simple construction for incorporating a safety diaphragm with a tubeless pneumatic tire in which the edges of the tire-shaped diaphragm are firmly but removably associated with the inside of the bead portions of the tire. The inextensible beads of the edges of the diaphragm, together with the flexible lip portions and adhesive, effect the securing of the edges of the diaphragm to the tire beads, and this supporting and securing relationship is not disturbed during the normal operation, or even during or after the blowout of the tire. However, it is a relatively simple matter to peel one or both edges of the diaphragm 22 away from the bead portion of one or both sides of the pneumatic tire, should it become necessary or desirable to inspect the inside, or to repair the inside of the pneumatic tire 10.

A restricted passageway or orifice, such as a grommet 32, is provided in the diaphragm 22 to allow the inflation of the pneumatic tire, but to provide for only relatively slow escape of air from inside the diaphragm 22, should the pneumatic tire be subject to a blowout in use. In order to inflate a tubeless pneumatic tire, it is the usual practice to remove the valve insides from the valve stem so that when a tire inflation hose is pressed on the valve stem, a quick shot of air under pressure is given the inside of the tire to snap the tire beads out into sealing relationship with the bead seats on the rim. My improved tubeless tire and safety diaphragm combination in no way prevents this same operation, but with the safety diaphragm transmitting the sealing pressure to the tire beads due to the slow passage of the air through orifice 32. During the continued inflation of the tire, the passage of air through the orifice 32 allows the air pressure on both sides of the diaphragm 22 to be equalized, and the diaphragm 22 will normally float in substantially the tire shape illustrated during the normal use of the tire, all as is well understood in view of the function and operation of conventional safety tubes.

While in accord with the patent statutes, I have specifically illustrated and described certain best known embodiments of my invention, it is to be particularly understood that I am not to be limited thereto or thereby, but that the scope of my invention is defined in the appended claims.

What I claim is:

1. The combination of a rim, a tubeless pneumatic tire and a toric-shaped, flexible but inextensible diaphragm of fabric-reinforced rubber, the outside periphery of the diaphragm being spaced inwardly from the inside periphery of the tire but being closer to the tire than to the rim the diaphragm at each lateral edge terminating in endless inextensible beads, flexible fabric-reinforced rubber lips extending radially inwardly of the diaphragm beads, adhesive means removably securing the laterally outside surfaces of the lips and the diaphragm beads to the laterally inside surfaces of the bead portions of the tire, said lips terminating short of the rim, a valve extending through the rim for inflating the inside of the diaphragm, said diaphragm having a restricted passage therethrough for equalizing the air pressure on opposite sides of the diaphragm.

2. The combination of a tubeless pneumatic tire and a toric-shaped, flexible but inextensible diaphragm of fabric-reinforced rubber, the outside periphery of the diaphragm being spaced closely inwardly from the inside periphery of the tire so as to act as a safety tire in case the pneumatic tire fails, the diaphragm at each lateral edge terminating in endless inextensible beads, and adhesive means removably securing the laterally outside surfaces of the diaphragm beads to the laterally inside surfaces of the bead portions of the tire, said diaphragm having a restricted passage therethrough for equalizing the air pressure on opposite sides of the diaphragm.

3. A tubeless pneumatic tire including a flexible rubberized fabric-reinforced diaphragm of tire-like shape but smaller than the inside of the tire so that the diaphragm except at its lateral edges is spaced from the inside of the tire, inextensible beads at the lateral edges of the diaphragm, and adhesive means fastening the bead portions of the diaphragm adjacent the inside of the beads of the tire, the diaphragm having a restricted passage therethrough for equalizing the air pressure on opposite sides of the diaphragm.

4. A tubeless tire including a diaphragm of tire-like shape positioned inside the tire but smaller than the inside of the tire so that the diaphragm, except at its lateral edges, is spaced from the inside of the tire, substantially inextensible beads at the lateral edges of the diaphragm, the diaphragm being constructed of two oppositely laid plies of rubberized bias-cut cord fabric having the lateral edges of one ply turned around the beads, and the lateral edges of the other ply extended radially inwardly of the beads and forming flexible lips, and adhesive means removably securing the lips and the sides of the diaphragm beads to the inside of the tire beads, the radial innermost edges of the lips terminating near the toes of the tire beads, the diaphragm having an orifice therethrough.

5. A tubeless tire including a diaphragm of tire-like shape positioned inside the tire but smaller than the inside of the tire so that the diaphragm, except at its lateral edges, is spaced from the inside of the tire, substantially inextensible beads at the lateral edges of the diaphragm, the diaphragm being constructed of two oppositely laid plies of rubberized bias-cut cord fabric having the lateral edges of at least one ply turned around the beads, flexible attaching strips of fabric-reinforced rubber secured to the edges of the diaphragm adjacent its beads and extended radially inwardly of the beads and forming flexible lips, and adhesive means removably securing the lips and the sides of the diaphragm beads to the inside of the tire beads, the radial innermost edges of the lips terminating near the toes of the tire beads, the diaphragm having an orifice therethrough.

6. A tubeless tire including a diaphragm of tire-like shape positioned inside the tire but smaller than the inside of the tire so that the diaphragm, except at its lateral edges, is spaced from the inside of the tire, substantially inextensible beads at the lateral edges of the diaphragm, the diaphragm being constructed of two oppositely laid plies of rubberized bias-cut cord fabric having the lateral edges of at least one ply turned around the beads, flexible attaching strips of fabric-reinforced rubber secured to the edges of the diaphragm adjacent its beads and extended radially inwardly of the beads and forming flexible lips, and adhesive means removably securing the lips and the sides of the diaphragm beads to the inside of the tire beads, the diaphragm having an orifice therethrough.

7. In combination, a conventional drop center rim, a tubeless pneumatic tire having a straight-sided carcass and inextensible beads mounted on the rim, an air-impervious, flexible diaphragm having rubberized restraining elements, the diaphragm being of tire-like shape but somewhat smaller than the inside of the tire carcass so that the diaphragm except at its lateral edges is spaced closely from the inside of the tire, inextensible beads at the lateral edges of the diaphragm, means associated with the tire beads removably fastening the bead portions of the diaphragm adjacent the inside of the tire beads, a valve extending through the rim and sealed in relation thereto for inflating the inside of the diaphragm, the diaphragm having a restricted passage therethrough for equalizing the air pressure inside the tire with the pressure inside the diaphragm.

8. In combination, a tubeless tire, a mounting rim, a diaphragm of tire-like shape but smaller than the inside of the tire whereby the diaphragm is spaced from the inside of the tire except at its edges, the outer periphery of the diaphragm being closer to the tire than to the rim, said diaphragm being made of two oppositely laid plies of rubberized bias cut cord fabric, wire beads at the lateral edges of the diaphragm, means spaced from the rim holding the edges of the diaphragm against the inside of the beads of the tire, and a valve in the rim in sealed relation therewith.

9. A tubeless pneumatic tire having a carcass and inextensible beads and including an air-impervious, flexible, restraining element-reinforced diaphragm of tire-like shape but somewhat smaller than the inside of the tire carcass so that the diaphragm except at its lateral edges is closely spaced from the inside of the tire, inextensible beads secured to the lateral edges of the diaphragm, and means connecting the bead portions of the diaphragm to the beads of the tire, the diaphragm having a restricted passage connecting the inside and the outside of the diaphragm so that the diaphragm floats without pressure in the air inflating the tire.

10. A removable diaphragm for dividing a tubeless tire cavity into two separate chambers, the diaphragm having the general shape of an open-beaded tire having a relatively thin, flexible body portion comprising a plurality of layers of air-impervious material reinforced throughout their extent with flexible but substantially inextensible restraining elements and having each edge of the diaphragm folded about and anchored to an inextensible bead, the body of the diaphragm being provided with restricted passage therethrough.

References Cited in the file of this patent

UNITED STATES PATENTS

| | | |
|---|---|---|
| 1,626,512 | Clark | Apr. 26, 1927 |
| 1,653,054 | Mack | Dec. 20, 1927 |
| 2,168,514 | Darrow | Aug. 8, 1939 |
| 2,241,593 | Gramelspacher | May 13, 1941 |
| 2,307,002 | Krusemark | Dec. 29, 1942 |

FOREIGN PATENTS

| | | |
|---|---|---|
| 291,503 | Great Britain | 1927 |